United States Patent
Kleuskens

(10) Patent No.: US 9,072,275 B2
(45) Date of Patent: Jul. 7, 2015

(54) PANORAMIC PET VIEW

(71) Applicant: Dale Allen Kleuskens, Canyon, TX (US)

(72) Inventor: Dale Allen Kleuskens, Canyon, TX (US)

( * ) Notice: Subject to any disclaimer, the term of this patent is extended or adjusted under 35 U.S.C. 154(b) by 70 days.

(21) Appl. No.: 13/855,392

(22) Filed: Apr. 2, 2013

(65) Prior Publication Data

US 2014/0290586 A1 Oct. 2, 2014

(51) Int. Cl.
*A01K 1/00* (2006.01)
*A01K 1/035* (2006.01)
*E04H 17/00* (2006.01)

(52) U.S. Cl.
CPC . *A01K 1/00* (2013.01); *A01K 1/035* (2013.01); *E04H 17/00* (2013.01)

(58) Field of Classification Search
CPC ......... A01K 1/035; E06B 1/363; E04H 17/00
USPC ............... 119/484, 452, 459, 472; 52/63; D30/114, 116; 256/1
See application file for complete search history.

(56) References Cited

U.S. PATENT DOCUMENTS

| | | | | |
|---|---|---|---|---|
| 2,834,441 A * | 5/1958 | Mims | | 52/73 |
| 3,074,125 A * | 1/1963 | Miller | | 52/63 |
| 4,445,459 A * | 5/1984 | Julie | | 119/28.5 |
| 4,856,575 A * | 8/1989 | Wells | | 160/353 |
| 5,148,767 A * | 9/1992 | Torchio | | 119/484 |
| 5,167,202 A * | 12/1992 | Bradford et al. | | 119/452 |
| 5,195,461 A * | 3/1993 | Brown | | 119/61.57 |
| D340,321 S * | 10/1993 | Bonn | | D30/114 |
| 5,337,697 A * | 8/1994 | Trimarchi et al. | | 119/484 |
| 5,469,807 A * | 11/1995 | Kosmaczeska | | 119/484 |
| 5,522,344 A * | 6/1996 | Demurjian | | 119/474 |
| 5,649,500 A * | 7/1997 | Klavemann et al. | | 119/452 |
| D382,373 S * | 8/1997 | Louden | | D30/114 |
| 5,890,455 A * | 4/1999 | Donchey | | 119/484 |
| 6,062,167 A * | 5/2000 | Soley | | 119/57.8 |
| 6,401,663 B1 * | 6/2002 | Meier, Jr. | | 119/452 |
| 6,581,668 B1 * | 6/2003 | Oakley | | 160/380 |
| 6,722,315 B2 * | 4/2004 | Sinor | | 119/484 |
| 7,861,674 B2 * | 1/2011 | Mercier | | 119/484 |
| 2006/0042558 A1 * | 3/2006 | Stephens | | 119/484 |
| 2007/0157889 A1 * | 7/2007 | McDonough | | 119/484 |
| 2007/0227462 A1 * | 10/2007 | Huff | | 119/484 |

OTHER PUBLICATIONS

PetPeek window (www.petpeek.info).*

* cited by examiner

*Primary Examiner* — Rob Swiatek
*Assistant Examiner* — Danielle Clerkley
(74) *Attorney, Agent, or Firm* — Shannon L Warren

(57) ABSTRACT

The Panoramic Pet View is a new approach to allowing pets to look through a wall or a fence. It provides a 180 degree view for the pet, and the pet can turn its head inside of the Panoramic Pet View. The design of this device allows the pet to hear sound as well as seeing in all directions including up and down.

2 Claims, 3 Drawing Sheets

PANORAMIC PET VIEW

CROSS-REFERENCE TO RELATED APPLICATIONS

Figure 1:
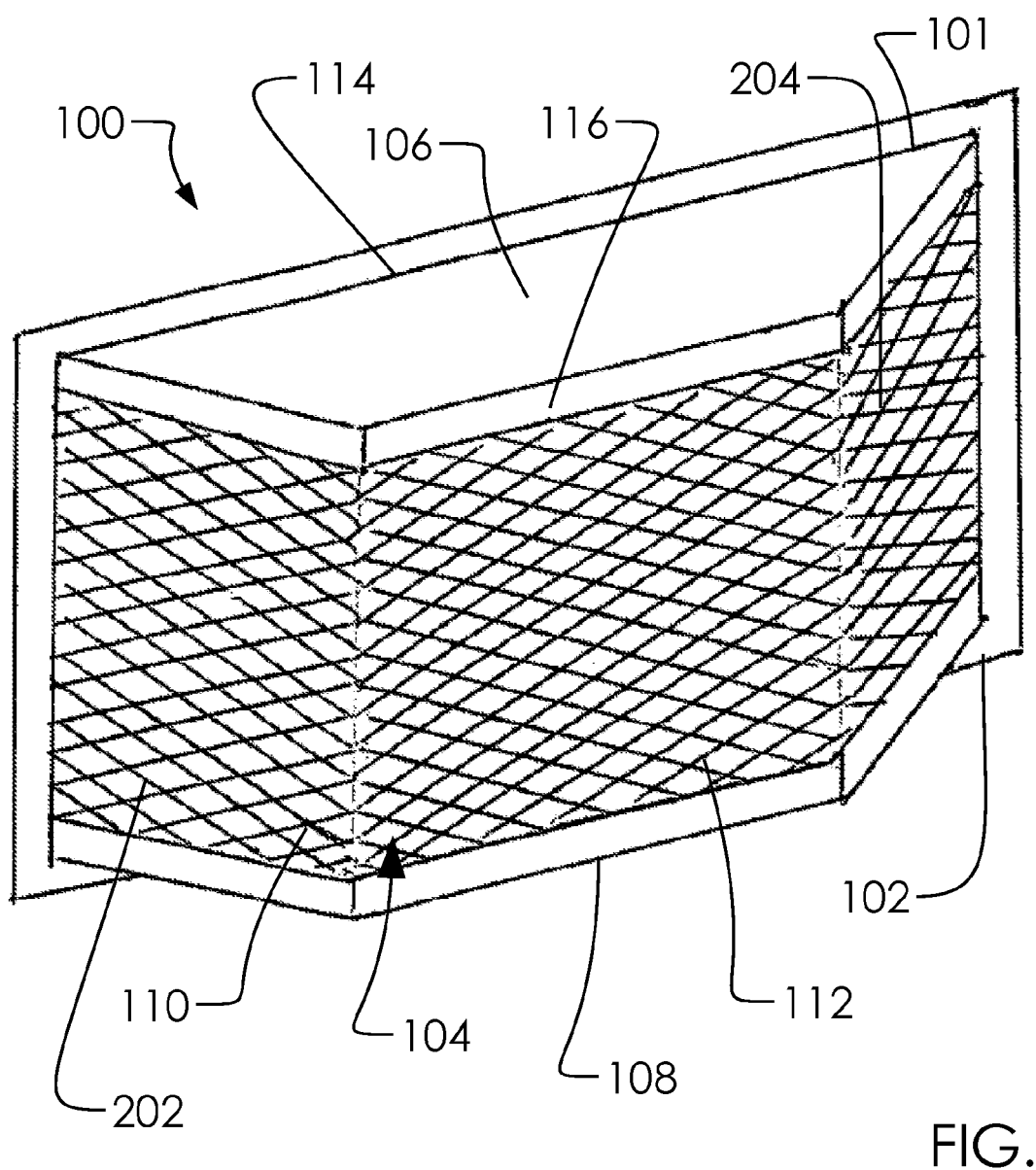

Not applicable.

STATEMENT REGARDING FEDERALLY SPONSORED RESEARCH OR DEVELOPMENT (IF APPLICABLE)

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

Field of the Invention

The Panoramic Pet View is a new approach to allowing pets to look through a wall or a fence. It provides a 180 degree view for the pet, and the pet can turn its head inside of the Panoramic Pet View. The design of this device allows the pet to hear sound as well as seeing in all directions including up and down.

DESCRIPTION OF RELATED ART INCLUDING INFORMATION DISCLOSED UNDER 37 CFR 1.97 AND 1.98

Not applicable.

BRIEF DESCRIPTION OF THE SEVERAL VIEWS OF THE DRAWING(S)

Figure 2:
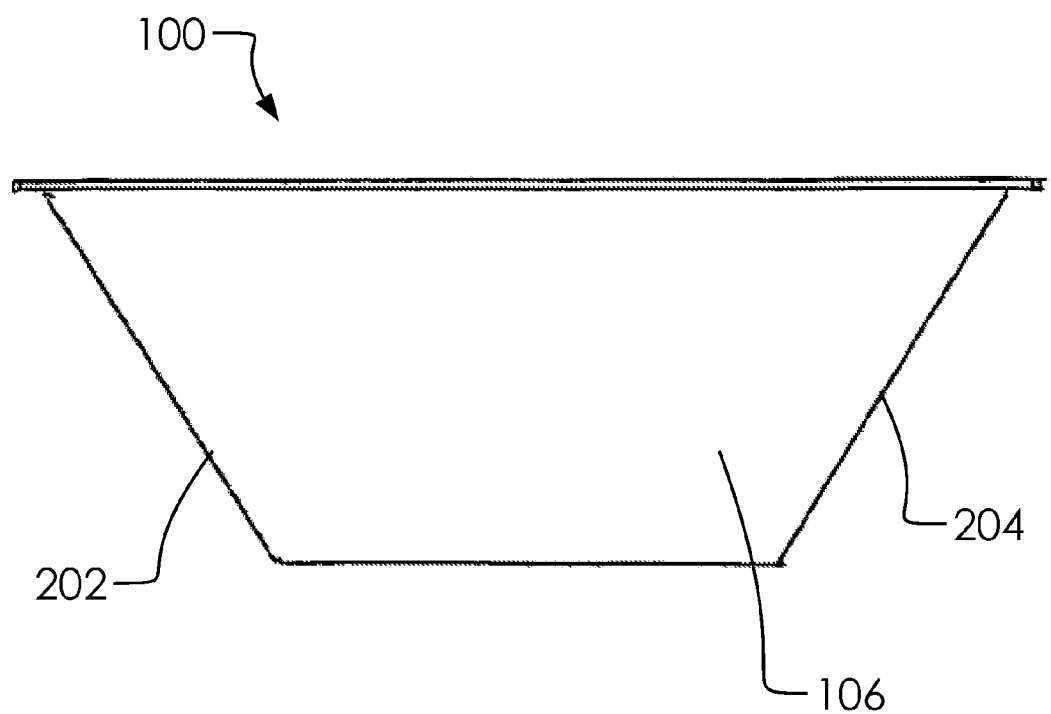
Figure 3:
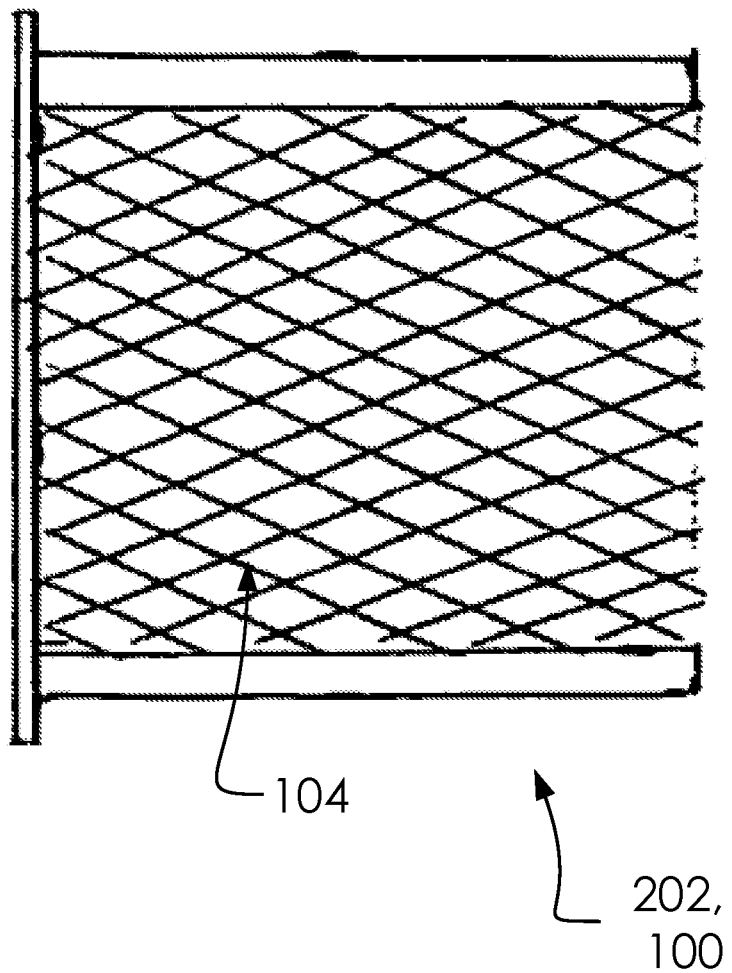

FIG. 1 illustrates a perspective front overview of a panoramic pet view device.
FIG. 2 illustrates an elevated top view of said panoramic pet view device.
FIG. 3 illustrates an elevated first side view of said panoramic pet view device.

DETAILED DESCRIPTION OF THE INVENTION

FIG. 1 illustrates a perspective front overview of a panoramic pet view device 100. Said panoramic pet view device 100 can comprise a welded steel construction. Dimensions will vary according to application. For example, a horse will require a larger unit than a dog.

Said panoramic pet view device 100 can be used to allow pets to look through a hole 101 in a wall or a fence 102. Said panoramic pet view device 100 can provide a 180 degree view for the pet. The design of said panoramic pet view device 100 can allow the pet to hear sound as well as seeing in all directions including up and down. Said hole 101 can comprise a substantially rectangular hole cut into said fence 102.

Said panoramic pet view device 100 can comprise a top 106, a bottom 108 and a cage 110 which enclose a containment 104. Said cage 110 can comprise a front cage 112, a first side 202 and a second side 204. An elevated horizontal cross-section of said panoramic pet view device 100 can be a trapezoid (trapezium). A trapezoid is a quadrilateral with one pair of parallel sides. Here a back edge 114 is parallel with a front edge 116. Said first side 202 and said second side 204 taper inward such that said front edge 116 is shorter than said back edge 114. As illustrated, said panoramic pet view device 100 can be substantially symmetrical about two of its three axes. Accordingly, when a pet puts its head into said containment 104 and looks through said cage 110 said pet can have a 180 degree panoramic view as to what is outside of said fence 102. Said top 106 does not comprise a portion of said cage 110. Said cage 110 can comprise a reticulate material, as illustrated. Said top 106 can comprise a top imperforate surface and said bottom 108 can comprise a bottom imperforate surface, as illustrated.

Said panoramic pet view device 100 can extend beyond said fence 102 and allow for the 180 degree view for the pet.

FIG. 2 illustrates an elevated top view of said panoramic pet view device 100. Said panoramic pet view device 100 can comprise a first side 202 and a second side 204. Said panoramic pet view device 100 can taper so as to narrow as said first side 202 approaches said second side 204.

FIG. 3 illustrates an elevated first side view of said panoramic pet view device 100.

ABSTRACT

The Panoramic Pet View is a new approach to allowing pets to look through a wall or a fence. It provides a 180 degree view for the pet, and the pet can turn its head inside of the Panoramic Pet View. The design of this device allows the pet to hear sound as well as seeing in all directions including up and down.

SEQUENCE LISTING

Not applicable.

The invention claimed is:

1. A panoramic pet view device comprising: an enclosure protruding through a hole in a fence; said enclosure comprising a first side, a second side, and a back edge parallel to a front side; said first side, said second side and said front side comprise a reticulate material; said enclosure further comprising a top imperforate surface and a bottom imperforate surface; and said enclosure being contained such that a pet cannot fit through said reticulate material or said enclosure.

2. The panoramic pet view device of claim 1 wherein: said top imperforate surface and said bottom imperforate surface of said enclosure comprise a trapezoid shape.

* * * * *